UNITED STATES PATENT OFFICE.

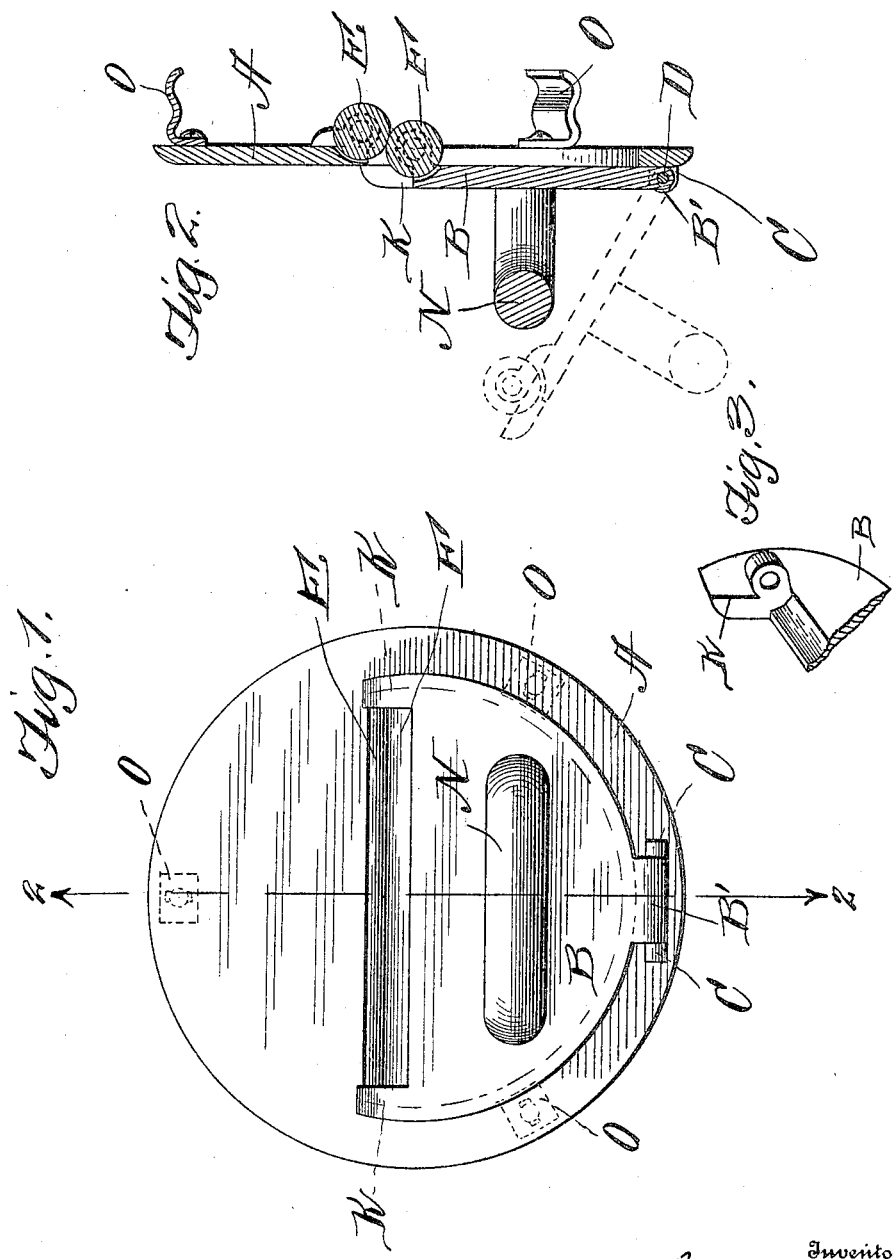

JOHN GIRARD, OF THOMASTON, CONNECTICUT.

DEVICE FOR WRINGING HOT TOWELS.

No. 822,733.  Specification of Letters Patent.  Patented June 5, 1906.

Application filed July 17, 1905. Serial No. 270,114.

*To all whom it may concern:*

Be it known that I, JOHN GIRARD, a citizen of the United States, residing at Thomaston, in the county of Litchfield and State of Connecticut, have invented certain new and useful Improvements in Devices for Wringing Hot Towels; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in devices for wringing hot towels; and the object of the invention is to produce a simple and efficient apparatus which may be placed upon the top of an ordinary kettle and securely held in place, and provided with rollers, one of which is stationary and the other being fastened to a hinged lid having a suitable handle, whereby the towel or cloth may be easily and quickly wrung by being drawn between the rollers.

My invention comprises various details of construction and combinations and arrangements of parts, which will be hereinafter fully described and then specifically defined in the appended claim.

I illustrate my invention in the accompanying drawings, in which—

Figure 1 is a top plan view of my improved wringing device, and Fig. 2 is a central sectional view through the same. Fig. 3 is a detail view showing the manner of journaling a roller upon the lid of the apparatus.

Reference now being had to the details of the drawings by letter, A designates a plate or disk, which may be of any size or shape, and substantially one-half of the same is cut away, leaving an opening which is partly closed by means of a lid B, having a shank portion B', which is hinged upon a pin D, carried by ears C, which project from the upper surface of the disk or plate A, the free swinging edge of said lid being recessed, forming the arms K. Mounted in suitable bearings upon said disk and adjacent to the forward marginal edge of said opening is a roller E, made, preferably, of metal or the same may be made of any material well adapted for the purpose. Said roller is preferably positioned beneath the upper surface of the disk, and F designates a second roller, which is journaled in suitable bearings projecting downward from the arms K at the free edge of the hinged lid or cover, as shown clearly in Fig. 3 of the drawings. The rollers are so positioned that when the cover is closed the two rollers will be in contact with each other.

N designates a handle, preferably of a non-heat-conducting material, which is fastened to the lid and provides means for raising and lowering the lid and holding the roller carried thereby frictionally in contact with the towel or other cloth to be wrung, the towel being held between the two rollers under pressure.

In order to hold the disk upon the top of a kettle or other receptacle, I provide resilient clips O, which are fastened to the under side of the disk or plate at intervals and so shaped that they may spring over the upper marginal edge of the kettle or receptacle and hold the device securely in place.

From the foregoing it will be noted that by the provision of a device embodying the features of my invention a simple and efficient means is afforded for use, especially in barber shops and other places where it is desired to utilize a hot moist cloth, and affording a convenient mechanism for wringing the towel, without the operator burning his or her hands, by simply drawing the towel between the rollers, and at the same time applying pressure to the handle, as will be readily understood.

While I have shown a particular shape and detailed construction of device as embodying the features of my invention, it will be understood that the same may be varied to adapt it to various conditions without in any way departing from the spirit of the invention.

Having thus fully described my invention, what I claim as new, and desire to secure by Letters Patent, is—

A device for wringing hot towels comprising a plate having an opening therein, resilient clips fastened to one face of said plate, a lid having an ear hinged to said plate, a handle upon said lid, the free swinging edge of said lid being recessed forming arms at the ends thereof, a roller journaled in suitable bearings extending from said arms, said roller extending into the recess between said arms, and a second roller journaled to said plate adjacent to the marginal edge of the opening therein, as set forth.

In testimony whereof I hereunto affix my signature in the presence of two witnesses.

JOHN GIRARD.

Witnesses:
JEREMIAH J. CONWAY,
ESTHER B. POTTER.